US007453816B2

United States Patent
Fields, Jr. et al.

(10) Patent No.: US 7,453,816 B2
(45) Date of Patent: Nov. 18, 2008

(54) METHOD AND APPARATUS FOR AUTOMATIC RECOVERY FROM A FAILED NODE CONCURRENT MAINTENANCE OPERATION

(75) Inventors: James Stephen Fields, Jr., Austin, TX (US); Michael Stephen Floyd, Austin, TX (US); Benjiman Lee Goodman, Cedar Park, TX (US); Paul Frank Lecocq, Cedar Park, TX (US); Praveen S. Reddy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 646 days.

(21) Appl. No.: 11/054,288

(22) Filed: Feb. 9, 2005

(65) Prior Publication Data
US 2006/0187818 A1 Aug. 24, 2006

(51) Int. Cl.
*G01R 31/08* (2006.01)
*G06F 13/00* (2006.01)

(52) U.S. Cl. .................. 370/241; 370/248; 370/252; 710/302; 710/304

(58) Field of Classification Search ......... 370/216–221, 370/242, 248, 252; 710/301–304
See application file for complete search history.

(56) References Cited

U.S. PATENT DOCUMENTS

| | | | | |
|---|---|---|---|---|
| 6,070,207 A | * | 5/2000 | Bell | 710/302 |
| 6,681,282 B1 | * | 1/2004 | Golden et al. | 710/302 |
| 7,107,398 B2 | * | 9/2006 | Depew et al. | 711/114 |
| 2002/0075870 A1 | * | 6/2002 | de Azevedo et al. | 370/390 |
| 2003/0167367 A1 | * | 9/2003 | Kaushik et al. | 710/302 |
| 2003/0193890 A1 | * | 10/2003 | Tsillas et al. | 370/216 |
| 2006/0159007 A1 | * | 7/2006 | Frutiger et al. | 370/216 |

* cited by examiner

*Primary Examiner*—Steven H. D Nguyen
*Assistant Examiner*—Thinh D Tran
(74) *Attorney, Agent, or Firm*—Duke W. Yee; Mark E. McBurney; Mari A. Stewart

(57) ABSTRACT

A method, apparatus, and computer instructions are provided by the present invention to automatically recover from a failed node concurrent maintenance operation. A control logic is provided to send a first test command to processors of a new node. If the first test command is successful, a second test command is sent to all processors or to the remaining nodes if nodes are removed. If the second command is successful, system operation is resumed with the newly configured topology with either nodes added or removed.

If the response is incorrect or a timeout has occurred, the control logic restores values to the current mode register and sends a third test command to check for an error. A fatal system attention is sent to a service processor or system software if an error is encountered. If no error, system operation is resumed with previously configured topology.

11 Claims, 6 Drawing Sheets

METHOD AND APPARATUS FOR AUTOMATIC RECOVERY FROM A FAILED NODE CONCURRENT MAINTENANCE OPERATION

BACKGROUND OF THE INVENTION

1. Technical Field

The present invention relates to a data processing system. In particular, the present invention relates to processor nodes in a data processing system. Still more particular, the present invention relates to automatic recovery from a failed node concurrent maintenance operation in a data processing system.

2. Description of Related Art

Processor node "HotPlug" or concurrent maintenance is the ability to add or remove a processor node from a fully functional data processing system without disrupting the operating system or software that is running on other processor nodes of the data processing system. A processor node comprises one or more processors, memory, input/output devices, all connected to each other via interconnect cable. In processor architecture like Power6, up to eight processor nodes may be added to the data processing system in one HotPlug. Thus, the ability to HotPlug a node allows a user to service or upgrade a system without costly downtimes caused by system shutdowns and restarts. Power6 processor is a product available from International Business Machines Corporation.

Existing node HotPlug implementations follows three high level steps. First, communication links between all nodes of the data processing system are temporarily disabled. Second, the old configuration settings are switched to new configuration settings if new processor nodes are added to the system or if processor nodes are removed from the system. Third, communication links are initialized to re-enable communication flow between all the nodes in the system. The above three steps are performed in a very short amount of time, since the software that is running in the system hangs if the communication paths between processor nodes are not available for transmission of data.

However, a problem lies in existing HotPlug implementations. If there is a problem with the communication link and the traffic is allowed to flow, data errors may occur. Data errors may result in a fatal error (known as a system or partition checkstop), which causes the loss of processes and data currently running on the system. In addition, this fatal error may cause system downtime, since the whole system or the partition must be rebooted.

Therefore, it would be advantageous to have an improved method, apparatus, and computer instructions for automatic recovery from a failed node HotPlug operation, such that if a communication error occurs between processor nodes, it will not result in system downtime.

SUMMARY OF THE INVENTION

The present invention provides a method, apparatus, and computer instructions for automatic recovery from a failed node HotPlug, or concurrent maintenance, operation. The present invention provides control logic included in processors in each node that updates values from a current mode register to a next mode register prior to initializing communications between a plurality of processor nodes in the data processing system, wherein the values comprise configuration settings of a processor node in the plurality of processors.

To hotplug add a new node to an existing system, the control logic sends a first test command to processors in the newly added node before adding that new node to the system. If this first test command is successful, the control logic updates all processors in the system to use the new mode register that includes the newly added nodes. The control logic then sends a second test command to all processors in the system. If both first and second test commands are successful, system operation is resumed including the newly added node. System firmware can then make available the resources of the newly added node to the users of the system.

If an error, such as incorrect response or timeout, is encountered during processing of the first test command, the hotplug add attempt is aborted and the firmware and/or service processor is informed of the failed attempt. In prior art this would have been fatal resulting in system checkstop.

If an error is encountered during processing of the second test command, the hotplug add attempt is aborted, the control logic then returns the system to the previously operating configuration, and the firmware and/or service processor is informed of the failed attempt (prior art would have resulted in system checkstop). The control logic then issues a third test command to the processors in the previously operating system to ensure the hotplug attempt did not corrupt previously working communication links. If the third test command fails, the control logic checkstops the system. If the third test command is successful, system operation is resumed only including the previously existing nodes.

To hotplug remove a node, a similar but simpler procedure is followed. After the firmware removes usage of resources on the node to be removed, the control logic updates all processors in the system to use the new mode register that excludes the newly removed node, and then sends a test command to processors in the remaining nodes to ensure the hotplug attempt did not corrupt previously working communication links. If the test command fails, the control logic checkstops the system. If the test command is successful, system operation is resumed only excluding the newly removed nodes.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
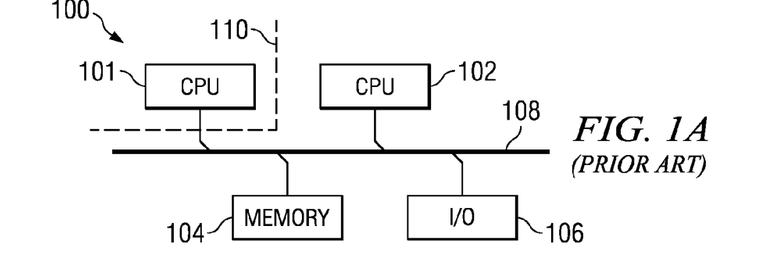
FIG. 1A is a block diagram of the major components of a multiprocessor system (MP) according to the prior art.

FIG. 1A illustrates a commercial SMP comprising processor1 101 and processor2 102, memory 104, and input/output (I/O) devices 106, all connected to each other via interconnect fabric 108. Interconnect fabric 108 includes wires and control logic for routing communication between the components as well as controlling the response of MP 100 to changes in the hardware configuration. Thus, new hardware components would also be connected (directly or indirectly) to existing components via interconnect fabric 108.

As illustrated within FIG. 1A, MP 100 comprises logical partition 110 (i.e., software implemented partition), indicated by dotted lines, that logically separates processor1 101 from processor2 102. Utilization of logical partition 110 within MP 100 allows processor1 101 and processor2 102 to operate independently of each other. Also, logical partition 110 substantially shields each processor from operating problems and downtime of the other processor.

Figure 1B:
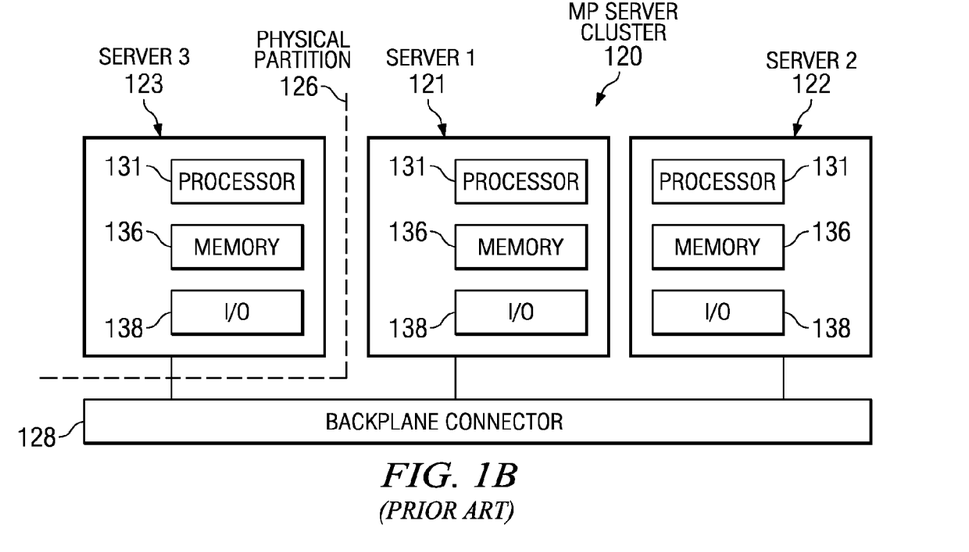
FIG. 1B is a block diagram illustrating multiple servers of a server cluster according to the prior art.

FIG. 1B illustrates a sample MP server cluster with physical partitions. MP server cluster 120 comprises three servers, server1 121, server2 122, and server3 123 interconnected via backplane connector 128. Each server is a complete processing system with processor 131, memory 136, and I/O 138, similarly to MP 100 of FIG. 1A. A physical partition 126, illustrated as a dotted line, separates server3 123 from server1 121 and server 2 122. With existing HotPlug implementation, server1 121 and server2 122 may be initially coupled to each other and then server3 123 is later added without taking the entire system down. Alternatively, all servers may be initially coupled to each other and then server3 123 is later removed without taking the entire system down.

Figure 2:
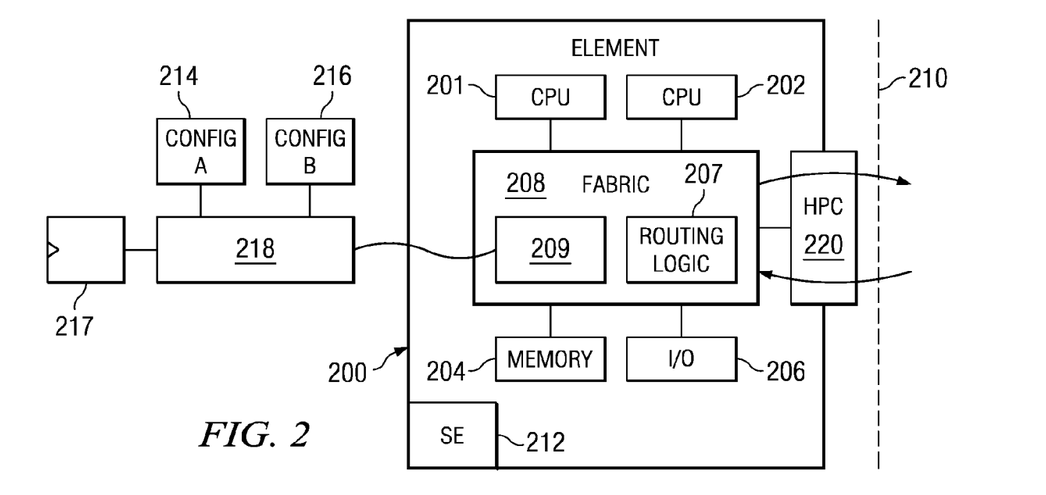
FIG. 2 is a block diagram of a data processing system (server) designed with fabric control logic utilized to provide various hot-plug features according to one embodiment of the present invention.

Turning now to FIG. 2, a multiprocessor system (MP) designed with fabric and other components that enable the implementation of the various features of the invention is depicted in accordance with a preferred embodiment of the present invention. MP 200 comprises processor1 201 and processor2 202. MP 200 also comprises memory 204 and input/output (I/O) components 206. The various components are interconnected via interconnect fabric 208, which comprises hot plug connector 220. Addition of new hot-pluggable hardware components is completed (directly or indirectly) via hot-plug connector 220, of interconnect fabric 208, as will be described in further detail below.

Interconnect fabric 208 includes wires and control logic for routing communication between the components as well as controlling the response of MP 100 to changes in the hardware configuration. Control logic comprises routing logic 207 and configuration setting logic 209. Specifically, as illustrated in the insert to the left of MP 200, configuration setting logic 209 comprises a first and second configuration setting, configA 214 and configB 216. ConfigA 214 and configB 216 are coupled to a mode setting register 218, which is controlled by latch 217. Actual operation of configA 214 and configB 216 along with configuration setting logic 209 will be described in greater detail below.

In addition to the above components, MP 200 also comprises a service element (S.E.) 212. S.E. 212 is a small microcontroller comprising special software-coded logic (separate from the operating system (OS)) that is utilized to maintain components of a system and complete interface operations for large-scale systems. S.E. 212 thus runs code required to control MP 200. S.E. 212 notifies the OS of additional processor resources within the MP (i.e., increase/decrease in number of processors) as well as addition/removal of other system resources (i.e., memory and I/O, etc.)

Figure 3:
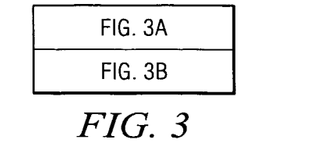
FIGS. 3, 3A and 3B are block diagrams of two servers of FIG. 2 included in a MP configured for hot-plugging in accordance with one embodiment of the present invention.
Figure 3A:
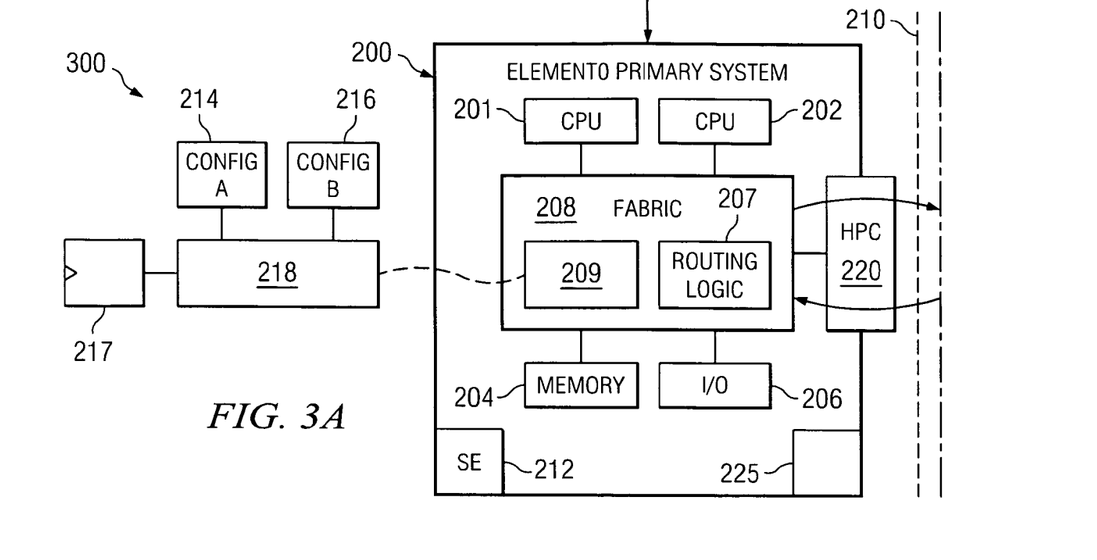
Figure 3B:
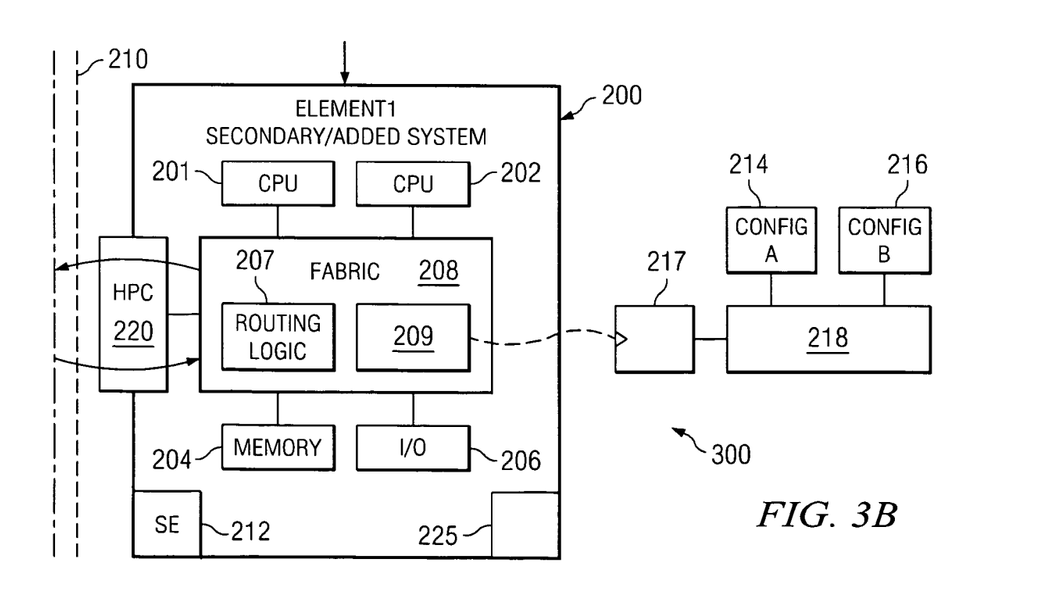

FIG. 3, FIG. 3A and FIG. 3B illustrate two MPs similar to that of 200 of FIG. 2 that are being coupled together via hot plug connectors 220 to create a larger symmetric MP (SMP) system. MPs 200 are labeled element0 and element1 and need to be labeled as such for descriptive purposes. Element1 may be coupled to Element0 via a wire, connector pin, or cable connection that is designed for coupling hot plug connectors 220 of separate MPs. In one embodiment, MPs may literally be plugged into a background processor expansion rack that enables expansion of the customer's SMP to accommodate additional MPs.

By example, Element0 is the primary system (or server) of a customer who is desirous of increasing the processing capabilities/resources of his primary system. Element1 is a secondary system being added to the primary system. The addition of Element1 occurs via the hot-plug operation and the customer never experiences downtime of Element0 while Element1 is being connected.

As illustrated within FIGS. 3, 3A and 3B, SMP 300 comprises a physical partition 210, indicated by dotted lines, that separate Element0 from Element1. The physical partition 210 enables each MP 200 to operate somewhat independent of the other, and in some implementations, physical partition 210 substantially shields each MP 200 from operating problems and downtime of the other MP 200.

When power is received by Element1, S.E.0 completes an automatic detection of the plugging in of another element to Element0. S.E.0 then assumes the role of master and triggers S.E.1 to initiate a Power-On-Reset (POR) of Element1. POR results in a turning on of the clocks, running a BIST (built in self test), and initializing the processors and memory and fabric of Element1.

According to one embodiment, S.E.1 also runs a test application to ensure that Element1 is operating properly. Based on the above tests, a determination is made as to whether Element1 is "clean" or ready for integration into the primary system (element0). If Element1 is cleared for integration, the S.E.0 and S.E.1 then initialize the interconnection between the fabric of each MP 200 while both MPs 200 are operating/ running. This process opens up the communication highway so that both fabric are able to share tasks and coordinate routing of information efficiently. The process includes enabling electrically-connected drivers and receivers and tuning the interface, if necessary, for most efficient operation of the combined system. Element0's control logic controls all operations on both Element0 and Element1. The control logic of Element1 automatically detects the operating parameters (e.g., configuration mode setting) of Element0 and synchronizes its own operating parameters to reflect those of Element0. Interconnect fabric 208 is logically and physically "joined" under the control of logic of Element0.

While the tuning of the interface is being completed, config B 216 is loaded into the config mode register 218 of both elements. The loading of the same config modes enables the combined system to operate with the same routing protocols at the fabric level. The process of selecting one configuration mode/protocol over the other is controlled by latch 217. In the dynamic example, when the S.E. registers that a next element has been plugged in, has completed initialization, and is ready to be incorporated into the system, it sets up configuration registers on both existing and new elements for the new topology. Then the SE performs a command to the hardware to say go In the illustrated embodiment, when the go command is performed, an automated state machine temporarily suspends the fabric operation, changes latch 217 to use configB, and resumes fabric operation. In an alternate embodiment, the SE command to go would synchronously change latch 217 on all elements. In either embodiment, the OS and I/O devices in the computer system do not see an outage because the configuration switchover occurs on the order of processor cycles (in this embodiment less than a microsecond). The value of the latch tells the hardware how to route information on the SMP and determines the routing/operating protocol implemented on the fabric. In one embodiment, latch serves as a select input for a multiplexer (MUX), which has its data input ports coupled to one of the config registers. The value within latch causes a selection of one config registers or other config registers as MUX output. The MUX output is loaded into config mode register 218. Automated state machine controllers then implement the protocol as the system is running.

The combined system continues operating with the new routing protocols taking into account the enhanced processing capacity and distributed memory, etc. The customer immediately obtains the benefits of increased processing resources/power of the combined system without ever experiencing downtime of the primary system or having to reboot the system.

Notably, the above process is scalable to include connection of a large number of additional elements either one at a time or concurrently with each other. When completed one at a time, the config register selected is switched back and forth for each new addition (or subtraction) of an element. Also, in another embodiment, a range of different config registers may be provided to handle up to particular numbers of hotplugged/connected elements. For example, 4 different registers files may be available for selection based on whether the system includes 1, 2, 3, or 4 elements, respectively. Config registers may point to particular locations in memory at which the larger operating/routing protocol designed for the particular hardware configuration is stored and activated based on the current configuration of the processing system.

However, during initialization process when the next element was plugged in, configuration registers set up on both existing and new elements and other types of set up for the new topology may not be performed properly. Yet, the SE continues to perform a command to the hardware to say "go", which temporarily suspends the fabric operation and changes latch 217 to use configB, and resumes fabric operation. This allows data to flow between Element0 and Element1, even though the set up is performed improperly under the new routing protocol as defined by value of the latch. Subsequently, data errors will occur and the system will encounter a fatal error causing system processes and data loss or even system downtime.

The present invention provides a method, apparatus, and computer instructions for automatic recovery from such failed node HotPlug or concurrent maintenance operation. In a preferred embodiment, the present invention extends the three high level steps of node HotPlug implementations to include a new step of sending a first test command to a processor on the new node if adding new processor node or to a processor on a remaining node if removing a processor. The new sending step may be implemented within the control logic of each element or the service element (SE).

The control logic tracks the response returned from the specific processor to which the first test command was sent and determines if a correct response is received. A correct response is a response which matches the response that was sent. An incorrect response is a response that does not match the response that was sent. Examples of incorrect response include response that has bad parity, bad response type, such as acknowledged or retry. If a correct response is received, in one embodiment, the control logic updates all processor nodes of the system to use a next mode register that specifies the newly added node. A second test command is then sent by the control logic to all processor nodes in the system for verification. Similarly, the control logic tracks the response returned from all processors to which the second test command was sent and determines if a correct response is returned. If the response is a correct response, communication links are initialized by the control logic to re-enable communication flow between all the processor nodes in the system including the newly added node.

During processing of the first test command, either an incorrect response is received or a hang may occur. A hang is determined by measuring the amount of time after the test command is sent using a counter. If the amount of time measured exceeds a predefined hang time, a hang has occurred. If either an incorrect response is received or if a hang occurs, the hotplug add attempt is aborted and the firmware and/or service processor is informed of the failed attempt. This is different from the prior art, in that instead of resulting to a fatal system checkstop, the control logic of the present invention notifies the service processor and/or firmware to handle the error.

Similarly, during processing of the second test command, if an incorrect response is received, the hotplug add attempt is also aborted and the new configuration settings are reverted back to the old configuration settings by the control logic. The firmware and/or service processor is also informed of the failed attempt rather than resulting to a fatal system checkstop.

Subsequently, a third test command is sent by the control logic to the processors in the previously operating system or old configuration settings to ensure that the hotplug add attempt has not corrupted previously working communication links. If the third test command fails, the control logic checkstops the system. However, if the third test command is successful, communication links are initialized by the control logic to re-enable communication flow between only previously existing processor nodes under the old configuration settings.

To hotplug remove a node, a similar but simpler procedure is followed. After the firmware removes usage of resources on the node to be removed, the control logic updates all processors in the system to use the next mode register, which excludes the newly removed node. The control logic then sends a first test command to processors in the remaining nodes to ensure that the hotplug remove attempt has not corrupted previously working communication links. If the first test command fails, the control logic checkstops the system. If the first test command is successful, communication links are initialized by the control logic to re-enable communication flow between processor nodes in the system excluding the newly removed node.

As illustrated above, configuration settings may be stored in configuration registers, such as configA and configB, to indicate a current mode and a next mode. In one embodiment, the value within the latch causes a selection of one config registers or the other config registers as MUX output. The MUX output is loaded into config mode register 218. In an alternative embodiment, one of the configuration registers, for example, configB, may be designated as a current mode register. Conversely, configA may be designated as a next mode register. The current mode register or configB may be updated with next mode register values or configA values when a pulse is received from a switch or latch and vice versa. If the current mode register includes existing configuration settings, the values are stored into configA on a switch as well.

The updating of configuration settings between configA and configB happens very quickly, since the hardware switch can perform very fast operation. Using a hardware implementation of a switch to update values of configB with values of configA provides a better performance than using a software implementation of scan communication (scom) to write values to configA.

Figure 4:
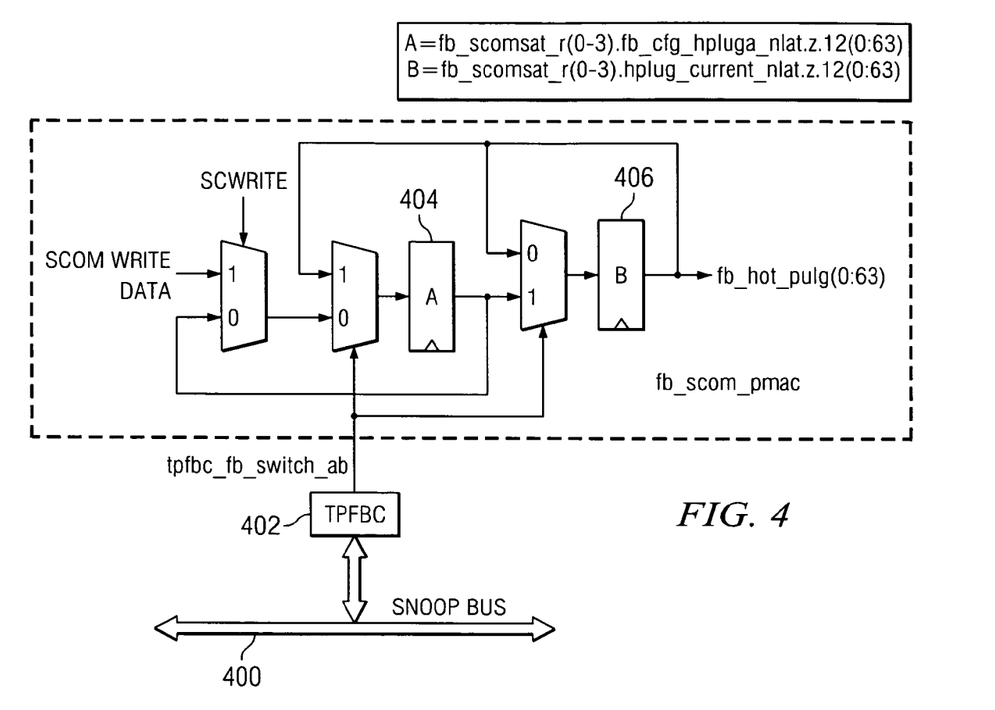
FIG. 4 is a diagram illustrating an exemplary implementation of switching values between HotPlug configuration mode registers in accordance with a preferred embodiment of the present invention.

Turning now to FIG. 4, a diagram illustrating an exemplary implementation of switching values between HotPlug configuration mode registers is depicted in accordance with a preferred embodiment of the present invention. As shown in FIG. 4, snoop bus 400 connects an element, such as Element0, to TPFBC switch 402. TPFBC switch 402 controls updating of values between config register A 404 and config register B 406.

In this illustrative example, config register A 404 is scom writable, meaning that the updating of values in config register A 404 is controlled by software. Config register B 406 is a non-scom hold latch that can be updated to values of config register A 404 with a pulse from TPFBC switch 402. Thus, when a pulse is received from TPFBC switch 402, the values of config register B 406 is updated with values of config register A 404. If config register B 406 currently includes existing configuration settings, the values of config register B 406 is stored to config register A 404 when a pulse is received from TPFBC switch 402 as well.

In this example, config register A 404 and config register B 406 are 64 bit registers. Thus, if a scom write is greater than 64 bits, more sets of config registers A and B can be used. Using hardware TPFBC switch to update values of config register B 406 happens much quicker than using software scom write to config register A 404. Thus, values of config register B 406 are stored into config register A on a switch and a second switch will restore the values of config register B 406 to original settings stored in config register A 404.

Upon reverting back to the old configuration settings, the present invention adds another step to the control logic for sending another test command to a processor in the system with the original settings and detecting a response. If the response is incorrect, a fatal error has occurred, and a fatal system attention may be issued by the control logic to a service processor to perform checkstop on the system. A checkstop is an operation which maintains the fail state of the system and drops all processes and data currently running on the system. A checkstop is typically performed by a service processor or maintenance software, which in turn sends an interrupt to a system software routine to log out and store all data.

In addition to reverting back to the old configuration settings, the control logic may reconfigure existing processor node to follow a different communication path. A communication path may be changed by opening or closing a link, since all communications links between processor nodes are point-to-point. One way of changing the communication path between processor nodes is by updating the routing table of a processor node.

Figure 5A:
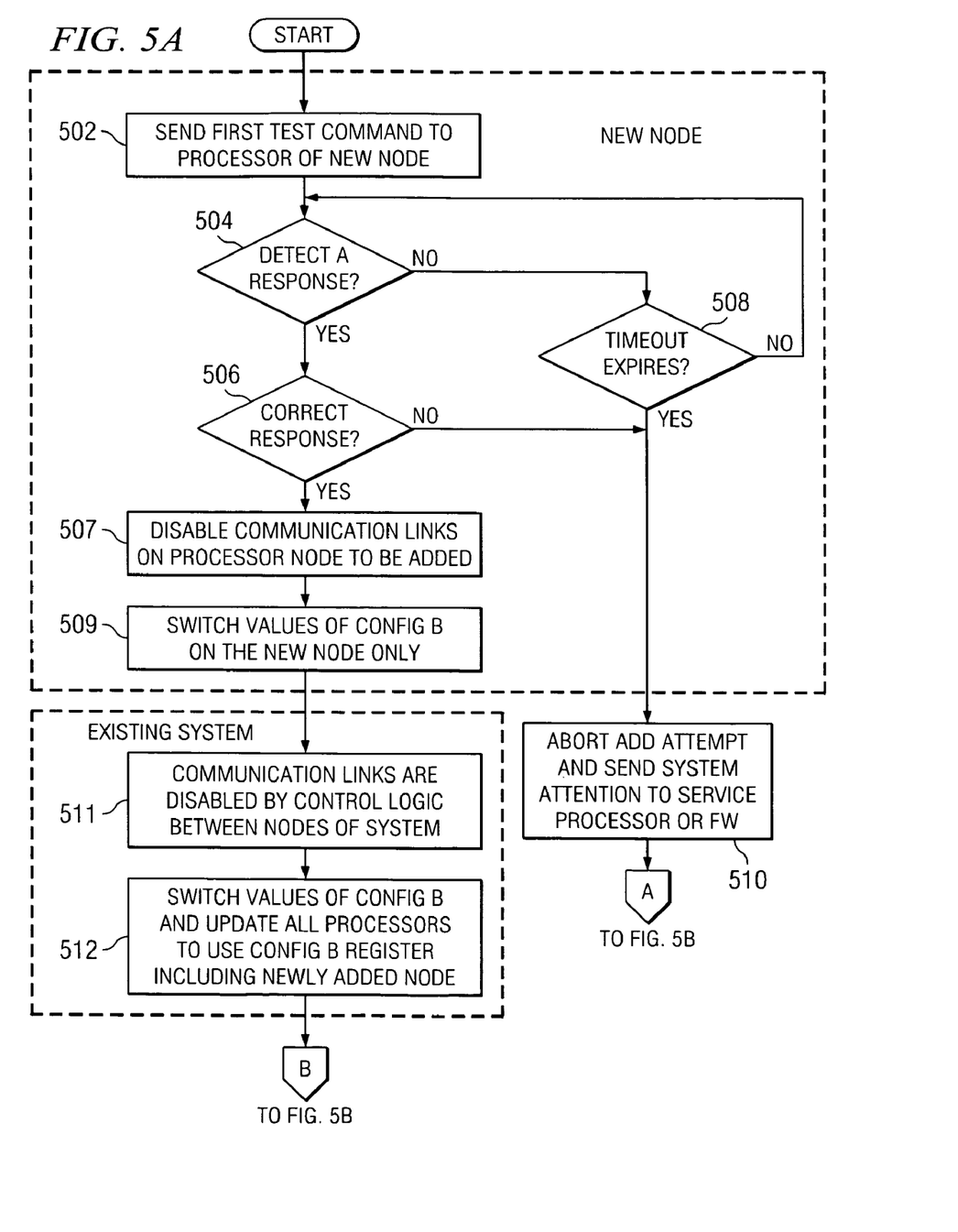
FIG. 5A is a flowchart of an exemplary process for automatic recovery of a failed node HotPlug add operation in accordance with a preferred embodiment of the present invention.

Turning now to FIG. 5A, a flowchart of an exemplary process for automatic recovery of a failed node concurrent maintenance add operation is depicted in accordance with a preferred embodiment of the present invention. As shown in FIG. 5A, the process begins when the control logic sends a first test command to processors of the new processor node to be added (step 502). The control logic then determines whether a response is detected (step 504) from the processors to which the first test command is sent.

If a response is detected, the control logic then determines whether a correct response is received (step 506). A correct response is a response that matches the test command sent. If a correct response is received, the process continues to step 507. If no correct response is received, the process continues to step 510.

Turning back to step 504, if no response is received, the control determines whether a timeout has expired (step 508). If a timeout has not expired, the process returns to step 504 to detect the next response. If a timeout has expired, the process continues to step 510. At step 510, the control logic aborts the concurrent maintenance add operation and sends a system attention to the service processor or system firmware. Thus, the process terminates thereafter.

At step 507, communication links on the processor node to be added are disabled by the control logic. Next, the control logic switches the values of the current mode register on the new processor node only (step 509). Steps 507 and 509 prepare the new processor node for a first test command after the configuration settings are switched on the existing nodes. Thus, these steps get the new processor node ready to be added.

After the values of the current mode register are switched, the control logic disables communication links between processor nodes of the existing system (step 511), switches the value of the current mode register on all the nodes of the existing system and updates all processors of the existing nodes to use the current mode register (step 512), which includes configuration settings of the new processor node. The process then continues to step 514 in FIG. 5B.

Figure 5B:
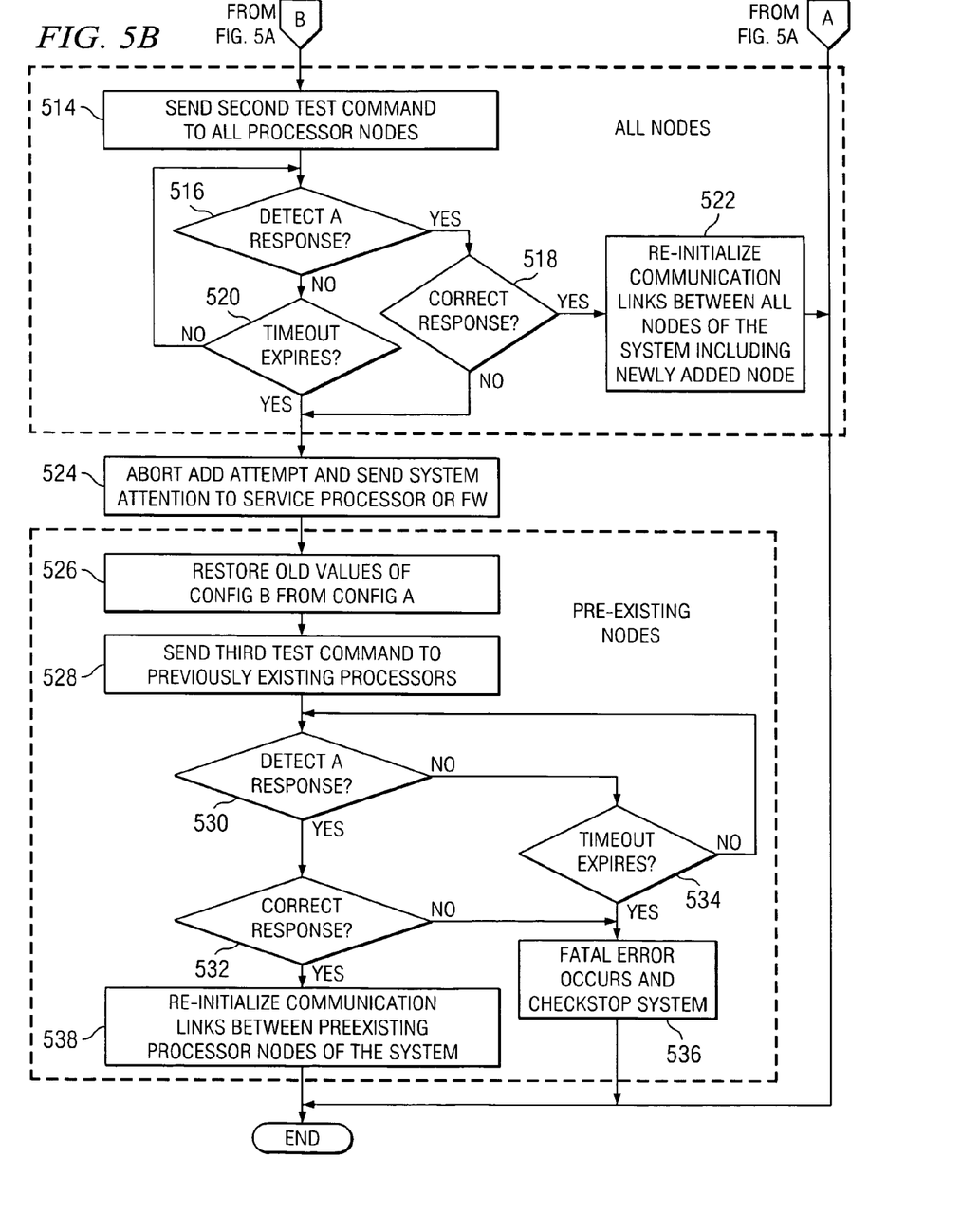
FIG. 5B is a flowchart of an exemplary process for automatic recovery of a failed node HotPlug add operation in continuation of FIG. 5A in accordance with a preferred embodiment of the present invention.

Turning now to FIG. 5B, a flowchart of an exemplary process for automatic recovery of a failed node concurrent maintenance add operation in continuation of FIG. 5A is depicted in accordance with a preferred embodiment of the present invention. As shown in FIG. 5B, the control logic sends a second test command to all processors of the processor nodes (step 514) and determines whether a response is detected (step 516). If a response is detected, the control logic then determines whether a correct response is received (step 518). If a correct response is received, the control logic reinitializes the communication links between processor nodes of the system (step 522) and the process terminates thereafter. If no correct response is received, the process continues to step 524.

Turning back to step 516, if no response is received, the control determines whether a timeout has expired (step 520). If a timeout has not expired, the process returns to step 516 to detect the next response. If a timeout has expired, the process continues to step 524. At step 524, the control logic aborts the concurrent maintenance add operation and sends a system attention to the service processor or system firmware.

The control logic then restores old values of the current mode register from the next mode register (step 526) and sends a third test command to the processors that are previously existing in the old configuration settings (step 528). The control logic then determines whether a response is detected from the previously existing processors (step 530).

If a response is detected, the control logic then determines whether a correct response is received (step 532). If a correct response is received, the control logic reinitializes communication links between preexisting processor nodes of the system (step 538) and the process terminates thereafter. If no correct response is received, the process continues to step 536.

Turning back to step 530, if no response is detected, the control determines whether a timeout has expired (step 534). If a timeout has not expired, the process returns to step 530 to detect the next response. If a timeout has expired, the process continues to step 536. At step 536, a fatal error has occurred and the control logic checkstops the system and the process terminates thereafter.

It is noted that steps 502-509 are steps performed on the processor node to be added, steps 511-512 are performing on existing system, steps 514-522 are performed on all processor nodes, and steps 526-538 are performed on previously existing nodes after the add operation has aborted.

Figure 6:
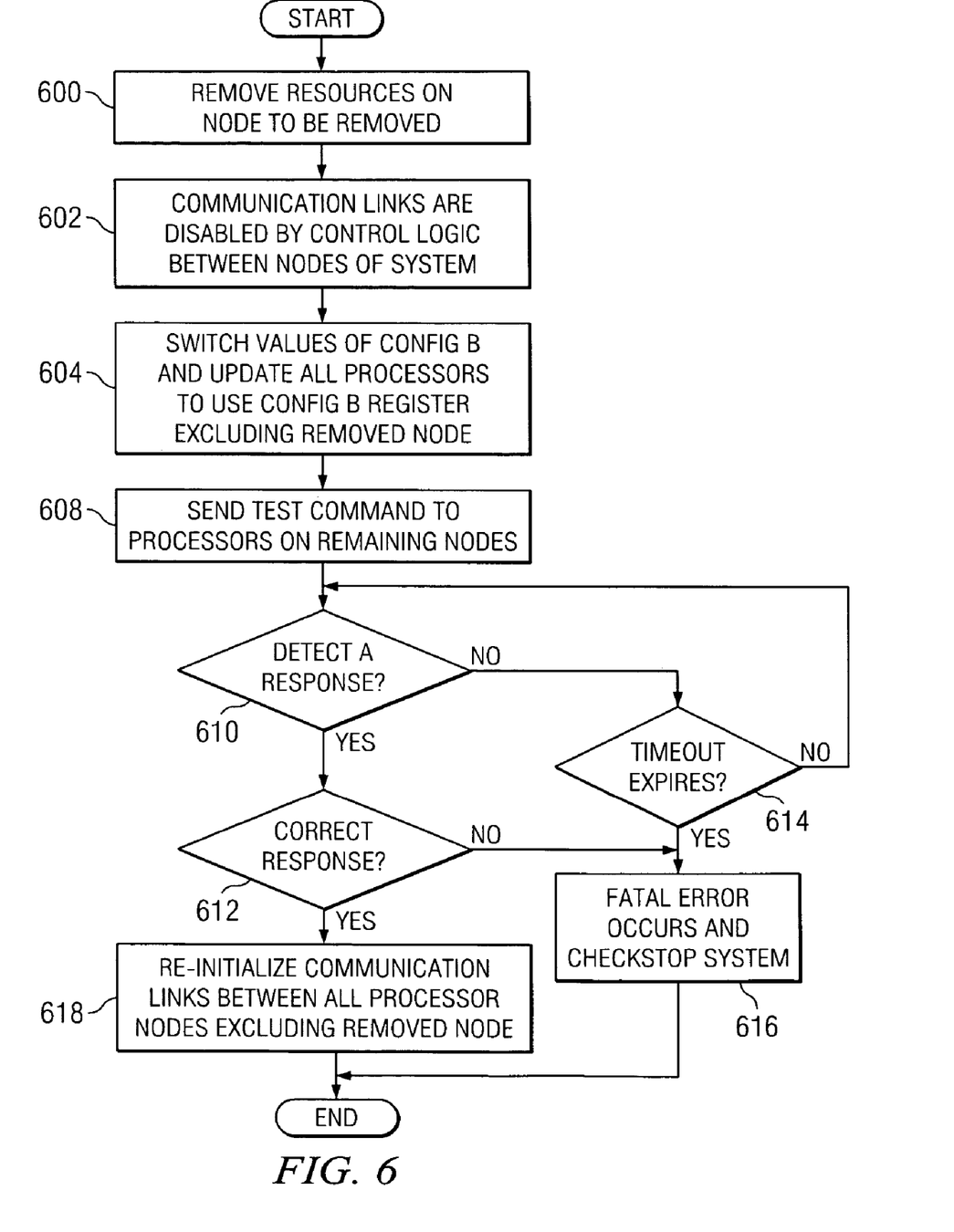
FIG. 6 is a flowchart of an exemplary process for a failed node Hotplug remove operation in accordance with a preferred embodiment of the present invention.

Turning now to FIG. 6, a flowchart of an exemplary process for automatic recovery of a failed node concurrent maintenance remove operation is depicted in accordance with a preferred embodiment of the present invention. As shown in FIG. 6, the process begins when resources on the nodes to be removed are removed by system software (step 600). The resources are data being accessed by system software and software running on the processor nodes.

Next, the control logic then disables communication links between all nodes of the system (step 602). After communication links are disabled, the control logic switches the values of the current mode register and updates all processors of the processor nodes to use the current mode register configuration settings (step 604), which exclude the newly removed node.

The control logic then send a test command to processors on the remaining nodes of the system (step 608) and determines whether a response is detected (step 610). If a response is detected, the control logic then determines whether a correct response is received (step 612). If a correct response is received, the control logic reinitializes communication links between preexisting processor nodes of the system excluding the removed node (step 618) and the process terminates thereafter. If no correct response is received, the process continues to step 616.

Turning back to step 610, if no response is detected, the control determines whether a timeout has expired (step 614). If a timeout has not expired, the process returns to step 610 to detect the next response. If a timeout has expired, the process continues to step 616. At step 616, a fatal error has occurred and the control logic checkstops the system and the process terminates thereafter.

In summary, the present invention provides methods, apparatus and computer instructions for automatic recovery from a node HotPlug failure operation. By using two designated HotPlug mode registers, configuration settings may be switched quickly between the current mode and the next mode. In addition, the present invention provides a control logic that sends a test command and determines if a correct response is received. If an incorrect response is received, the control logic may revert back to the old configuration setting and retest the original system with another test command. In this way, communication error is reduced and system downtime is minimized.

It is important to note that while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for automatic recovery from a failed node concurrent maintenance add operation, the method comprising:

disabling communications between a plurality of processor nodes in the data processing system;

sending, by a control logic, a first test command to processors of a new processor node to be added to the data processing system;

detecting, by the control logic, one of a response from the processors of the new processor node and a timeout;

responsive to detecting the response from the processors of the new processor node, determining, by the control logic, if the response is a correct response matching the first test command;

responsive to a correct response, updating, by the control logic, values of a current mode register, wherein the values comprise configuration settings of processors of the new processor node;

updating, by the control logic, all processors in the plurality of processor nodes to use values of the current mode register;

sending, by the control logic, a second test command to all processors in the plurality of processor nodes;

detecting, by the control logic, one of a response from all processors in the plurality of processors and a timeout;

determining, by the control logic, if the response is a correct response matching the second test command; and responsive to a correct response, initializing, by the control logic, communications between the plurality of processor nodes in the data processing system including the new processor node.

2. The method of claim 1, further comprising:

responsive to one of detecting a timeout and determining that the response is not a correct response, aborting an add operation of the new processor node; and sending a system attention to one of a service processor and a system software of the data processing system.

3. The method of claim 1, further comprising:

responsive to one of detecting the timeout and determining that the response is not a correct response, aborting an add operation of the new processor node;

restoring values to the current mode register, wherein the values comprise configuration settings of previously existing processors of the plurality of processor nodes; and sending a system attention to one of a service processor and a system software of the data processing system.

4. The method of claim 3, further comprising:

sending a third test command to previously existing processors in the plurality of processor nodes according to the values in the current mode register;

detecting one of a response from the previously existing processors in the plurality of processor nodes and a timeout;

determining if the response is a correct response matching the second test command; and if the response is a correct response, initializing communications between previously existing processors in the plurality of processor nodes.

5. The method of claim 4, further comprising:

responsive to one of detecting a timeout and determining that the response is not a correct response, checkstopping the data processing system.

6. A method in a data processing system for automatic recovery from a failed node concurrent maintenance remove operation, the method comprising:

removing resources on a processor node to be removed from a plurality of processor nodes in the data processing system;

disabling communication links between the plurality of processor nodes;

updating values of a current mode register, wherein the values comprise configuration settings of processors of the plurality of processor nodes excluding the processor node to be removed;

sending a test command to remaining processors of the plurality of processor nodes;

detecting one of a response from the remaining processors of the plurality of processor nodes and a timeout; and responsive to detecting a response from the remaining processors, determining if the response is a correct response matching the test command if the response is a correct response, initializing communications between the plurality of processor nodes in the data processing system excluding the processor node to be removed; and responsive to one of detecting the timeout and determining that the response is not a correct response, check stopping the data processing system.

7. A data processing system for automatic recovery from a failed node concurrent maintenance operation, the data processing system comprising:

a processor;

a memory connected to a processor via a processor bus;

wherein the processor is adapted to execute computer implemented instructions in the memory to:

disable communications between a plurality of processor nodes in the data processing system;

send a first test command to processors of a new processor node to be added to the data processing system;

detect one of a response from the processors of the new processor node and a timeout;

wherein the processor is further adapted to execute computer implemented instructions in the memory to:

determine if the response is a correct response matching the first test command, responsive to detecting the response from the processors of the new processor node;

update values of a current mode register if the response is a correct response, wherein the values comprise configuration settings of processors of the new processor node;

update all processors in the plurality of processor nodes to use values of the current mode register abort an add operation of the new processor node, responsive to one of detecting a timeout and determining that the response is not a correct response;

send a system attention to one of a service processor and a system software of the data processing system;

send a second test command to all processors in the plurality of processor nodes;

detect one of a response from all processors in the plurality of processors and the timeout;

determining if the response is a correct response matching the second test command; and initialize communications between the plurality of processor nodes in the data processing system including the new processor node, if the response is a correct response.

8. The data processing system of claim 7, wherein the processor is further adapted to execute computer implemented instructions in the memory to:

abort an add operation of the new processor node responsive to one of detecting the timeout and determining that the response is not a correct response;

restore values to the current mode register, wherein the values comprise configuration settings of previously existing processors of the plurality of processor nodes; and send a system attention to one of a service processor and a system software of the data processing system.

9. The data processing system of claim 8, wherein the processor is further adapted to execute computer implemented instructions in the memory to:

send a third test command to previously existing processors in the plurality of processor nodes according to the values in the current mode register;

detect one of a response from the previously existing processors in the plurality of processor nodes and a timeout;

determine if the response is a correct response matching the second test command;

initialize communications between previously existing processors in the plurality of processor nodes if the response is a correct response; and checkstop the data processing system, responsive to one of detecting the timeout and determining that the response is not a correct response.

10. The data processing system of claim 9, wherein the processor is further adapted to execute computer implemented instructions in the memory to:

remove resources on a processor node to be removed from a plurality of processor nodes in the data processing system;

disable communication links between the plurality of processor nodes;

update values of a current mode register, wherein the values comprise configuration settings of processors of the plurality of processor nodes excluding the processor node to be removed;

send a test command to remaining processors of the plurality of processor nodes;

detect one of a response from the remaining processors of the plurality of processor nodes and a timeout; and determine if the response is a correct response matching the test command responsive to detecting a response from the remaining processors.

11. The data processing system of claim 10, wherein the processor is further adapted to execute computer implemented instructions in the memory to:

initialize communications between the plurality of processor nodes in the data processing system excluding the processor node to be removed, if the response is a correct response; and checkstop the data processing system, responsive to one of detecting a timeout and determining that the response is not a correct response.

* * * * *